Oct. 29, 1963     F. A. KRAUSS     3,108,821
OVER STEERING ASSEMBLY FOR TOWED VEHICLES
Original Filed April 19, 1961
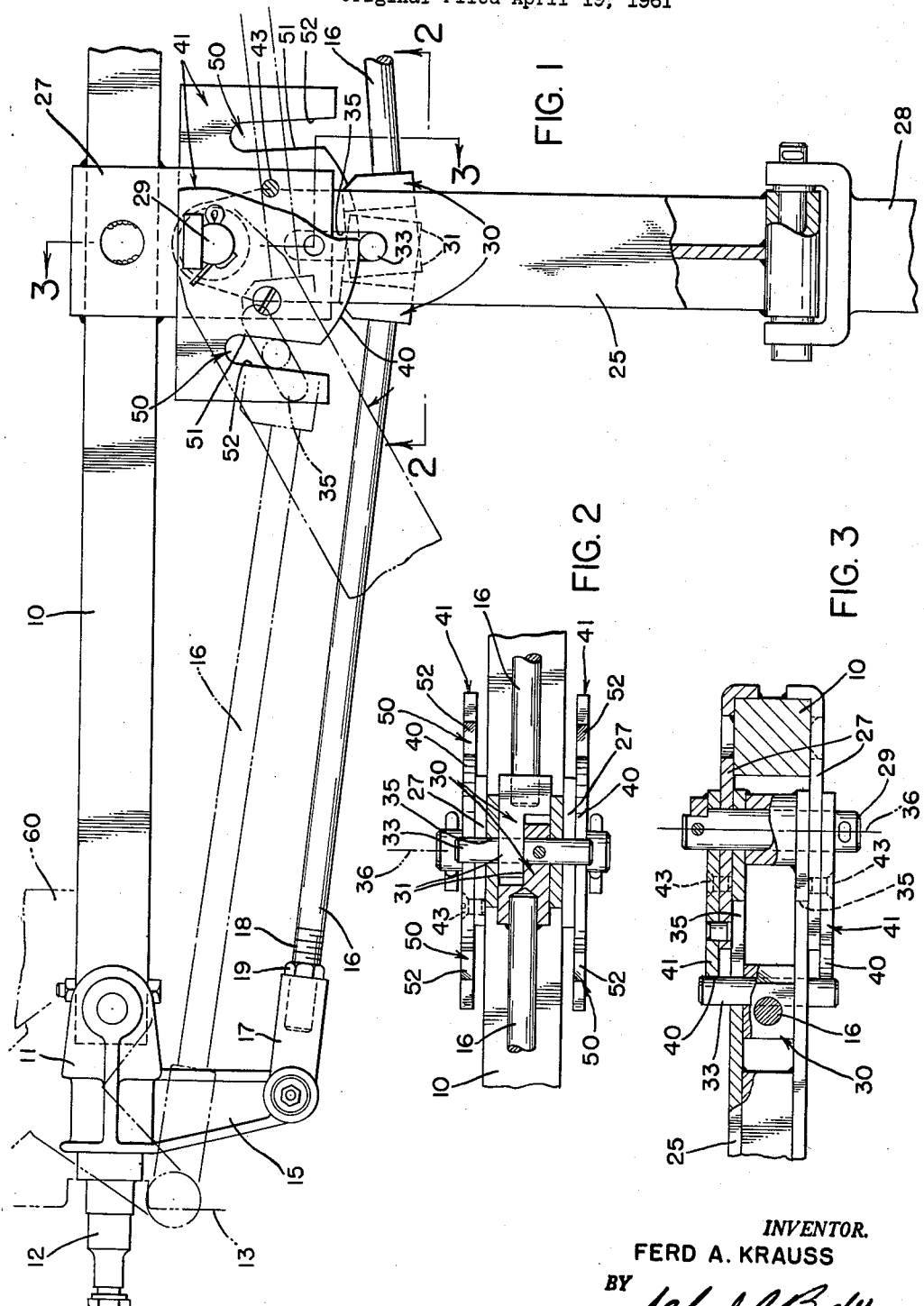
INVENTOR.
FERD A. KRAUSS
BY
*Alfred C Body*
ATTORNEY United States Patent Office 3,108,821
Patented Oct. 29, 1963

3,108,821
OVER STEERING ASSEMBLY FOR TOWED VEHICLES
Ferd A. Krauss, Bay Village, Ohio, assignor to United Manufacturing Company, Cleveland, Ohio, a corporation of Ohio
Continuation of application Ser. No. 104,182, Apr. 19, 1961. This application May 17, 1963, Ser. No. 282,531
7 Claims. (Cl. 280—103)

This invention pertains to the art of towed vehicles, and more particularly to an over steering arrangement therefor.

This application is a continuing application of my co-pending application Serial No. 104,182, filed April 19, 1961, now abandoned.

In the art of four wheel towed vehicles, it is conventional to mount the two front wheels on pivoted steering knuckles and to mechanically fasten these knuckles to a center steering arm through a pair of tie rods. A draw bar is then pivoted about a horizontal axis to the front end of this arm, which draw bar may then be coupled to a towing vehicle. As the draw bar is swung from side to side to follow the towing vehicle, this motion is transmitted to the steering arm and thence to the wheels through to the tie rods.

These wheels, of course, have a maximum turning angle beyond which they cannot turn, and it is this maximum turning angle which creates problems with which the present invention primarily deals. Thus, in the event the towing vehicle turns through an angle greater than the corresponding maximum turning angle of the wheels forces result on the steering arm of the draw bar sufficient to cause serious damage to the steering arm of the draw bar or other parts of the steering mechanism. Also, when the towing vehicle attempts to back up with the towed vehicle behind, there is a tendency for jack-knifing to occur, that is, the towing vehicle backs in one direction, and the towed vehicle in the other and in this event, if the backing of the towing vehicle continues, the steering arm will of necessity be swung through an angle greater than the maximum corresponding turning angle of the wheels and the forces developed are such that oftentimes breakage of the draw bar, the steering arm, or the steering mechanism results.

Various arrangements have been proposed in the past to de-couple the center steering arm from the wheels when the wheels have been turned through this maximum angle such that the arm can continue to turn without damage. However, in all such previous arrangements whenever the release or de-coupling occurred, the wheels were usually free to turn independently of each other or free to turn independently of the towed vehicle. The result has been extreme instability of the towed vehicle. Also extreme difficulty was experienced in regaining control of the steering of the vehicle when the steering arm was moved back into its normal operating range.

The present invention contemplates an over steering arrangement for towed vehicles of the type described which overcomes all of the above-referred to difficulties and others, is simple in construction, positive in operation at all times, and which enables the draw bar to be turned through angles greater than the equivalent maximum turning angles of the wheels.

In accordance with the present invention, the center steering arm and tie rods are coupled together by means of a member longitudinally movable relative to the length of the arm and means are provided for holding the member in a predetermined position relative to the arm for the turning angle of the arm corresponding to the maximum desired turning angle of the wheels and for releasing the member for longitudinal movement when the arm is swung through an angle beyond this maximum desired turning angle of the wheels. Stops are also provided for preventing the wheels from turning beyond their predetermined turning arc.

In a somewhat more limited aspect of the invention, the means for holding the member in the predetermined position in the slot includes a cam member having both an arcuate surface with the center of curvature corresponding to the pivot axis of the steering arm and an arcuate length corresponding relatively to the maximum angle of turn of the wheels and a second surface adapted to force the pin to move longitudinally in the slot when the arm is swung beyond the maximum desired turning angle of the wheels. After the pin has entered the longitudinal slot, the wheels are locked at the maximum angle of turn.

The principal object of the present invention is the provision of a new and improved steering arrangement for towed vehicles which de-couples the steering arm from the wheels when the arm is turned through an angle greater than that through which the wheels can turn and yet which holds the wheels in stable relationship one to the other.

Another object of the invention is the provision of a new and improved over-steering arrangement for towed vehicles which prevents breakage of the steering arm when the towing vehicle and the towed vehicle jack-knife relative to each other.

Another object of the invention is the provision of a new and improved steering arrangement for towed vehicles which can de-couple the arm from the wheels of a towed vehicle but still hold the wheels in the proper steered relationship.

Another object of the invention is the provision of a new and improved arrangement which permits relative movement of a steering arm relative to the tie rods when the arm is swung through an angle greater than that through which the wheels to which the rods are connected can be turned.

The invention may take physical form in certain parts and arrangements of parts, a further embodiment of which will be described in detail in this specification and illustrated in the accompanying drawing which forms a part hereof and wherein:

FIG. 1 is a top plan view of a portion of an axle assembly illustrating a preferred embodiment of the invention showing in dotted lines the draw bar pivoted through an angle greater than the maximum corresponding turning angle of the wheels;

FIG. 2 is a side cross-sectional view of FIG. 1 taken approximately on the line 2—2 thereof; and, FIG. 3 is a cross sectional view of FIG. 1 taken approximately on the line 3—3 thereof.

Referring now to the drawings wherein the showings are for the purpose of illustrating a preferred embodiment of the invention only, and not for the purpose of limiting same, FIG. 1 shows what may be termed a more or less conventional axle and wheel assembly comprised of an elongated axle 10, a pair of steering knuckles 11 (only one shown) pivoted to the ends of the axle 10 about a vertical axis and having a shaft 12 upon which a wheel 13 (not shown) is rotatably supported. The steering knuckle 11 also includes a forwardly extending steering link 15 which is pivoted at its forward end about a vertical axis to a transversely extending tie rod 16. This tie rod 16 in the embodiment shown has a threaded end 18 threadably engaged in a yoke 17 in turn pivotally coupled to the link 15. A nut 19 locks the rod 16 in any adjusted relative position to the yoke 17.

A center steering arm 25 is pivotally fastened to the center of the axle 10 in any desired manner, but in the embodiment shown by means of a pair of plates 27 fastened to the top and bottom sides of the axle 10 and extending forwardly from the axle and a pin 29 extending vertically through aligned openings in the plates 27 and the rear end of the arm 25. A draw bar 28 is pivoted to the front end of the steering arm 25 about a horizontal axis.

The structure described so far is all relatively conventional in the art and obviously may take a number of different forms. It will not be detailed further herein.

In accordance with the invention, each tie rod 16 terminates at the steering arm end in the form of a block 30, each block having a portion 31 of reduced vertical thickness and with the portions 31 in overlapping relationship. A pin 33 is rigidly fastened to the lower one of the portions 31 and extends upwardly and downwardly through the portions 31 and thence into longitudinally extending slots 35 formed in the upper and lower plates of steering arm 25. The existence of these slots forms a very important part of the present invention. Thus these slots will have a transverse width just large enough so that the pin 33 can slide longitudinally in the slots 35. It is to be noted that the longitudinal center planes of these slots 35 also extend through the axis 36 of the pin 29.

It will be appreciated that with the construction just described, as the steering arm 25 is swung about its pivot axis 36 in either direction, the steering knuckles 11 are turned about their vertical axis in a manner as is known in the art. It will also be appreciated, however, that the steering knuckles 11 will have a maximum arc or angle of swing which, depending upon the construction of the steering knuckles 11 and the relationship to the axle 10, may vary e.g., from between 30 to 60 degrees. However, as above pointed out, it is quite possible that forces on the draw bar 28 can attempt to force the arm through angles of swing greater than that which the steering knuckles can accommodate. Heretofore something had to give either by bending or breaking.

In accordance with the present invention, means are provided for holding pin 33 in a predetermined longitudinal position in the slots 35 during the normal turning arcs of the steering knuckles 11 and the steering arm 25 and for releasing it beyond such normal arc. While such means may take a number of different forms such as springs or the like, in the preferred embodiment of the invention, cam surfaces 40 are provided on a pair of cam plates 41 fastened onto the plates 27 by means of bolts 43 and the pin 33 extends upwardly and downwardly through the slots 35 a sufficient distance so as to engage the cam surfaces 40. The cam plates 41 are substantially identical and two are used to equalize the strain on the pin 33. For simplicity, only one of the cam plates will be discussed hereinafter. The cam surface 40, as is shown, is arcuate and has a center of curvature corresponding to the axis 36 and the radius of curvature is such as to hold the pin 33 bottomed against the outer longitudinal end of the slot 35. The arcuate length of the cam surface 40 is predetermined to correspond with the maximum predetermined turning arc of the steering knuckles 11. Thus, the cam surface 40 terminates at each end in a slot 50 extending in a generally fore and aft direction in the cam plate 41 and defined by flat parallel inner and outer cam surfaces 51, 52 respectively and spaced a distance apart slightly greater than the diameter of the pin 33 to slidingly receive same.

The outer cam surface 52 also extends forward beyond the cam surface 40. Thus, as the steering arm 25 is swung through an angle such that the pin 33 goes beyond the end of the cam surface 40, the pin 33 is engaged by the outer cam surface 52 and further movement of the steering arm 25 in that direction results in the pin 33 being forced longitudinally to the rear in the slot 35. In order to prevent this longitudinal movement of the pin 33 from transmitting turning motion to the steering knuckles 11, the surface 52 is arranged so as to be tangent to the arc having a center of curvature corresponding to the pivot axis of the tie rod 16 with the steering knuckle 11 when the steering knuckle 11 is in the maximum predetermined turned position. Thus, the pin 33 is forced to move longitudinally in the slot 35 on this tangent, but such tangential movement does not result in steering movement of the steering knuckle 11. It will be appreciated that the maximum swing of the steering arm 25 is thus not limited by the maximum swing of the steering knuckle 11, but instead, will be limited by other factors, for example, the depth of the slot 50 which can be made to any desired depth or by other portions of the steering arm 25 coming into physical engagement with the axle 10 or with other portions of the vehicle.

During this movement of the pin 33 in the slot 35, it will be appreciated that the adjacent ends of the tie rods 16 can also pivot relative to each other. It is of course possible to make the two tie rods in one piece and allow this motion to be taken up by physical flexing of the tie rods 16.

As the steering arm 25 is turned in the opposite direction, the pin 33 engages the inner cam surface 51 and is forced outwardly in the slot 35 until it passes the point of intersection of the two cam surfaces 51 and 40 and thereafter the cam surface 40 holds the pin 33 in the outer longitudinal end of the slot 35 and thereafter the steering arm 25 through the draw bar 28 regains steering control of the wheels.

As the swing of steering arm 25 is continued to the other extreme, the same action will occur when the pin 33 passes the other end of the cam surface 40 and enters the other slot 50.

It will be appreciated that the outer cam surface 52 engages the pin 33 and provides a force which forces it longitudinally in the slot 35. In some instances, it is possible to eliminate the outer cam surface 52 and provide a physical stop 60 for the steering knuckle 11 such that when the steering arm is swung through an angle such that the pin 33 will clear the cam surface 40, the force transmitted from the stop 60 through the steering knuckle 11 and the tie rods 16 will then force the pin 33 to move longitudinally in the slot 35.

In any event, the steering arm 25 can move through an angle of swing greater than the maximum angle of swing of the steering knuckle 11, and yet when the steering arm is de-coupled from the steering knuckle 11, the knuckle is held in essentially the same angular position.

Furthermore, when the steering arm 25 is moved back into its normal position, the control over the wheels is quickly and positively regained.

It will be appreciated that the same arrangement will work with the tie rods located to the rear of the axle.

It is to be further noted that with the arrangement shown, namely, of the two tie rods being pivoted relative to each other about the same pivot axis, that a true turning relationship between the two wheels is maintained. The inner wheel on a turn will move through an arc less than the arc of swing of the wheel on the outer side of the turn.

The invention can be further defined as providing in the usual towed vehicle mechanism a cam having a cam surface or lobe 40 with the center of curvature at the pivotal axis of the steering arm 25, and a substantially constant radius portion on the lobe and extending over a distance corresponding to the turning angle of the arm necessary for turning the wheels through a predetermined angle. Accordingly, the cam lobe can cause release of the tie rods 16 when the arm exceeds a predetermined turning angle.

Thus it will be seen that an embodiment of the invention has been described in detail which accomplishes all of the objects of the invention and others and provides an over-steering arrangement which is simple in construction and yet positive in operation.

The invention has been described with reference to a preferred embodiment. Obviously, modifications and alterations will occur to others upon a reading and understanding of this specification, and it is my intention to include all such modifications and alterations insofar as they come within the scope of the appended claims.

Having thus described my invention, I claim:

1. In a steering arrangement for a wheeled vehicle to be towed, including a wheel mounted for turning about a generally vertical axis through a predetermined maximum angle by a steering knuckle, an elongated steering arm pivoted to the vehicle, and a tie rod pivoted to said steering knuckle and mechanically interconnecting the steering arm and the wheel so that when the steering arm is moved through an angle, the wheel will be likewise turned through an angle, the improvement which comprises: a member at the pivot axis between the steering arm and the tie rod, said member being normally movable longitudinally relative to the length of the steering arm and means for holding said member from longitudinal movement for angular movements of the steering arm until the predetermined maximum turning angle of the wheel is reached and guide means for guiding said member substantially in a path longitudinal of said arm and substantially equidistant at all points from the pivotal axis between said tie rod and said steering knuckle after said steering arm has turned beyond a predetermined angle.

2. In a towed vehicle having a pair of wheels, each pivoted about a generally vertical axis relative to the vehicle, an elongated steering arm pivoted to the vehicle, and tie rods operatively associated with the wheels at an axis to turn same through an angle and having a pivotal connection with said steering arm, the improvement which comprises: said pivotal connection being comprised of a longitudinally extending slot in said steering arm and a member connected to said tie rods extending into said slot and means for holding said member in a predetermined longitudinal position in said slot only over a predetermined angle of swing of said steering arm for turning said wheels through a predetermined angle and guide means for guiding said member in a path longitudinal of said arm and substantially equidistant at all points from said wheel and tie rod joining axis after said steering arm has turned beyond a predetermined angle.

3. In a towed vehicle having a pair of wheels, each pivoted about a generally vertical axis relative to the vehicle, a steering arm pivoted to the vehicle and tie rods extending from the wheels and being pivotally connected about an axis to said steering arm, the improvement which comprises: said pivotal connection being comprised of a longitudinally extending slot in said steering arm and a member associated with said tie rods extending into said slot and guide means for guiding said member substantially in a path equidistant at all points from said wheel axis after said steering arm has been turned beyond a predetermined angle.

4. In a towed vehicle comprised of a pair of wheels, turnable about a generally vertical axis, a steering arm pivoted to said vehicle about a generally vertical axis, tie rods mechanically interconnecting said steering arm and said wheels whereby when said steering arm is swung through an angle, said wheels will be swung through a corresponding angle, the improvement which comprises: said steering arm having a longitudinally extending slot, a pivot member operatively associated with said tie rods and extending into said slot and having a normal position adjacent the end of said slot remote from the steering arm pivot axis, a cam member having an arcuate surface with a center of curvature corresponding to the pivot axis of said steering arm and an arcuate length corresponding to the maximum turning angle of said wheels, said pivot member being arranged to bear against said arcuate surface and said end of said longitudinal slot whereby said pivot member is prevented from longitudinal movement in said slot during normal turning swings of said steering arm and is released for longitudinal movement when said pivot member is moved past the end of said arcuate surface.

5. In a towed vehicle, an axle, steering knuckles mounted on each end of said axle for turning movement about a generally vertical axis, a pair of wheels mounted on said steering knuckles for rotation about generally horizontal axes, a steering arm pivoted to said axle about a predetermined vertical axis, tie rods extending from said steering knuckles to said steering arm, a longitudinal slot in said steering arm, a pin fastened to said vehicle and extending into said slot, a cam member fastened to said axle and having an arcuate surface with a center of curvature corresponding to the pivot axis of said steering arm, and a radius such as to hold said pin against the end of said slot remote from said pivot axis, said pin adapted to engage the remote end of said slot and said arcuate surface, said arcuate surface having an arcuate length only corresponding to the maximum turning angle of said wheels.

6. The improvement of claim 5 wherein said cam member has slots at each end of said arcuate surface, said slot having inner and outer parallel surfaces, said surfaces being generally tangent to the curve having a center of curvature corresponding to the pivot axis between the tie rod and the steering knuckle on the same side of the vehicle.

7. In a steering arrangement for a wheeled vehicle to be towed, including a wheel mounted for turning about a generally vertical axis and through a predetermined angle, an elongated steering arm pivoted to said vehicle, and a tie rod mechanically interconnecting said steering arm and the wheels so that when the steering arm is pivoted through an angle the wheel is likewise turned through an angle, the improvement comprising: a cam having a cam lobe with a center of curvature at the pivotal axis of said steering arm and a substantially constant radius portion on said lobe and extending over a distance corresponding to the turning angle of said arm necessary for turning said wheel through said predetermined angle, a member carried by said arm and riding along said cam lobe for causing said tie rods and said arm to move in unison while said member is riding along said substantially constant radius portion of said cam lobe, release means on said cam for allowing further pivotal movement of said arm after said member reaches the end of said substantially constant radius portion of said lobe in either direction without substantial further pivotal movement of said wheel, and said release means comprising a relief portion at either end of said substantially constant radius portion of said lobe, said member carried by said arm passing into one of said relief portions when said arm has been pivoted through a given angle in either direction, and means responsive to said member passing into one of said relief portions to disconnect said tie rod from responding to further pivotal movement of said steering arm.

References Cited in the file of this patent

UNITED STATES PATENTS 2,974,978     Isachsen _____ Mar. 14, 1961

FOREIGN PATENTS 77,649     Denmark _____ June 8, 1954
1,073,808     France _____ Mar. 24, 1954